United States Patent [19]
Takahashi

[11] Patent Number: 5,940,218
[45] Date of Patent: *Aug. 17, 1999

[54] OPTICAL SYSTEM AND OPTICAL APPARATUS

[75] Inventor: Koichi Takahashi, Hachioji, Japan

[73] Assignee: Olympus Optical Co., Ltd., Tokyo, Japan

[*] Notice: This patent is subject to a terminal disclaimer.

[21] Appl. No.: 09/099,197

[22] Filed: Jun. 18, 1998

Related U.S. Application Data

[62] Division of application No. 08/697,059, Aug. 20, 1996, Pat. No. 5,812,323.

[30] Foreign Application Priority Data

Aug. 21, 1995 [JP] Japan .................................. 7-211594

[51] Int. Cl.$^6$ ................................................ G02B 27/14
[52] U.S. Cl. ................................................ 359/630
[58] Field of Search ................................ 359/630, 631, 359/632, 633, 634, 637, 638, 639

[56] References Cited

U.S. PATENT DOCUMENTS

| | | | |
|---|---|---|---|
| Re. 27,356 | 5/1972 | La Russa | 359/631 |
| 3,810,221 | 5/1974 | Plummer | 88/1.5 |
| 3,836,931 | 9/1974 | Plummer | 354/155 |
| 4,026,641 | 5/1977 | Bosserman et al. | 350/298 |
| 4,322,135 | 3/1982 | Freeman | 350/410 |
| 4,669,810 | 6/1987 | Wood | 350/3.7 |
| 5,274,406 | 12/1993 | Tejima et al. | 353/70 |
| 5,539,578 | 7/1996 | Togino et al. | 359/630 |
| 5,546,227 | 8/1996 | Yasugaki et al. | 359/631 |
| 5,596,433 | 1/1997 | Konuma | 359/631 |
| 5,699,194 | 12/1997 | Takahashi | 359/633 |
| 5,701,202 | 12/1997 | Takahashi | 359/631 |

FOREIGN PATENT DOCUMENTS

| | | |
|---|---|---|
| 0687932A2 | 12/1995 | European Pat. Off. . |
| 07730183A2 | 9/1996 | European Pat. Off. . |
| 62-214782 | 9/1987 | Japan . |
| 3-101709 | 4/1991 | Japan . |

*Primary Examiner*—Georgia Epps
*Assistant Examiner*—Suzanne Letendre
*Attorney, Agent, or Firm*—Pillsbury Madison & Sutro LLP

[57] ABSTRACT

An image display apparatus which enables observation of a clear image at a wide field angle with substantially no reduction in the brightness of the observation image, and which is extremely small in size and light in weight and hence unlikely to cause the observer to be fatigued. The image display apparatus includes an image display device (6) for displaying an image, and an ocular optical system (7) for projecting the image displayed by the image display device (6) and for leading the projected image to an observer's eyeball (1). The ocular optical system (7) has at least three surfaces, and a space formed by the at least three surfaces is filled with a medium having a refractive index larger than 1. The at least three surfaces are, in the order from the observer's eyeball (1) toward the image display device (6), a first surface (3) which is a refracting surface, a second surface (4) which is decentered or tilted with respect to an observer's visual axis (2) and serves as both an internally reflecting surface and a refracting surface, and a third surface (5) which is a reflecting surface of positive power facing the second surface (4). Internal reflection at the second surface (4) is total reflection.

47 Claims, 10 Drawing Sheets

FIG. 14 (a) (PRIOR ART)
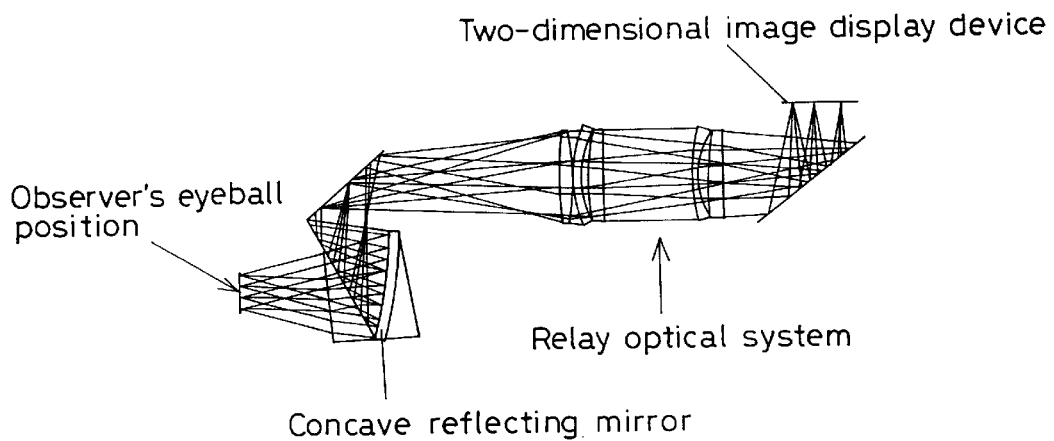
FIG. 14 (b) (PRIOR ART)
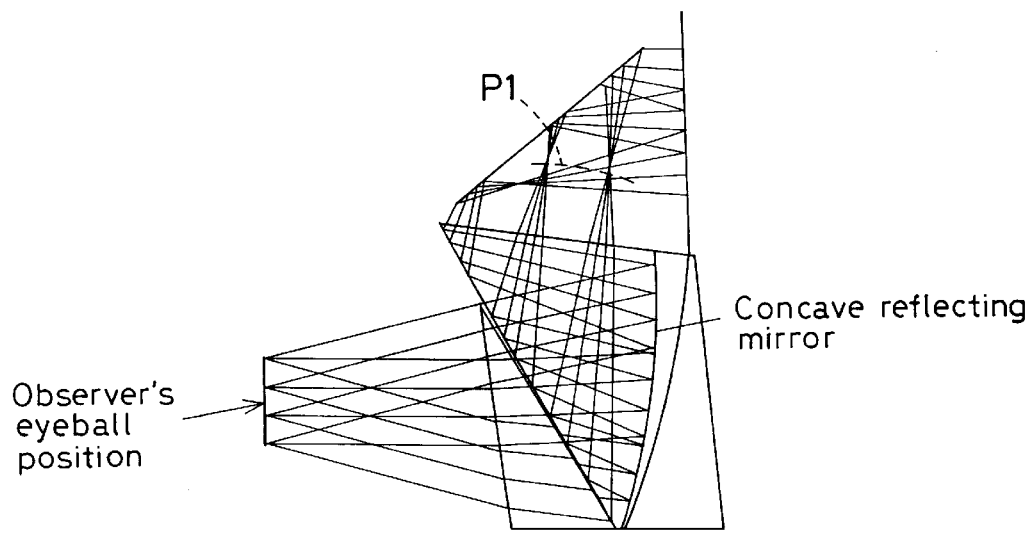

FIG. 15 (PRIOR ART)
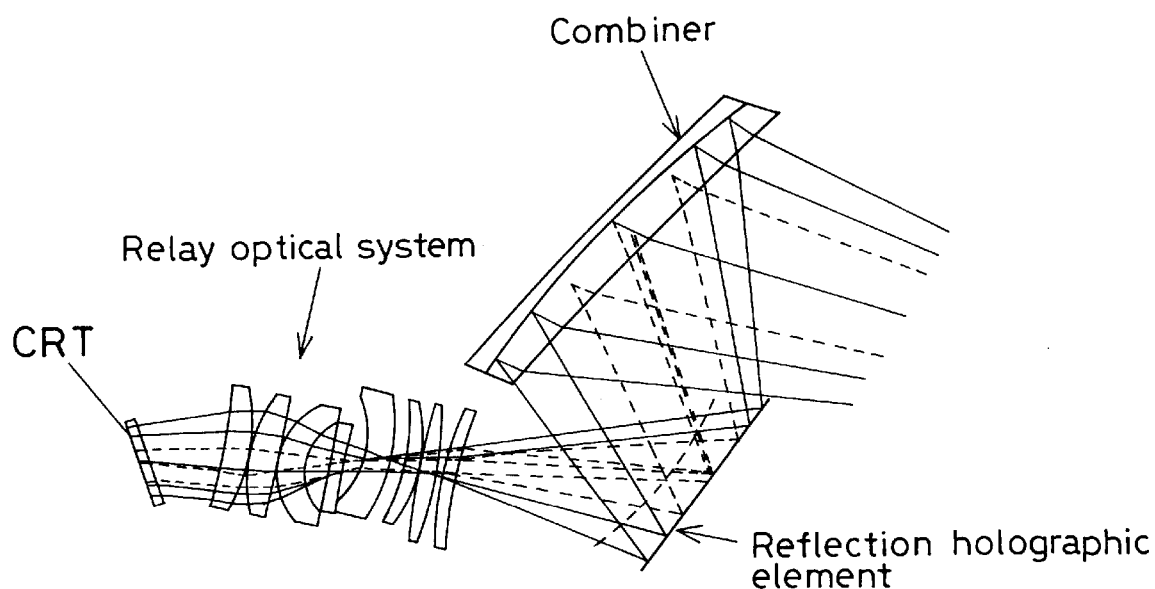
FIG.16 (a)(PRIOR ART)
FIG.16 (b)(PRIOR ART)
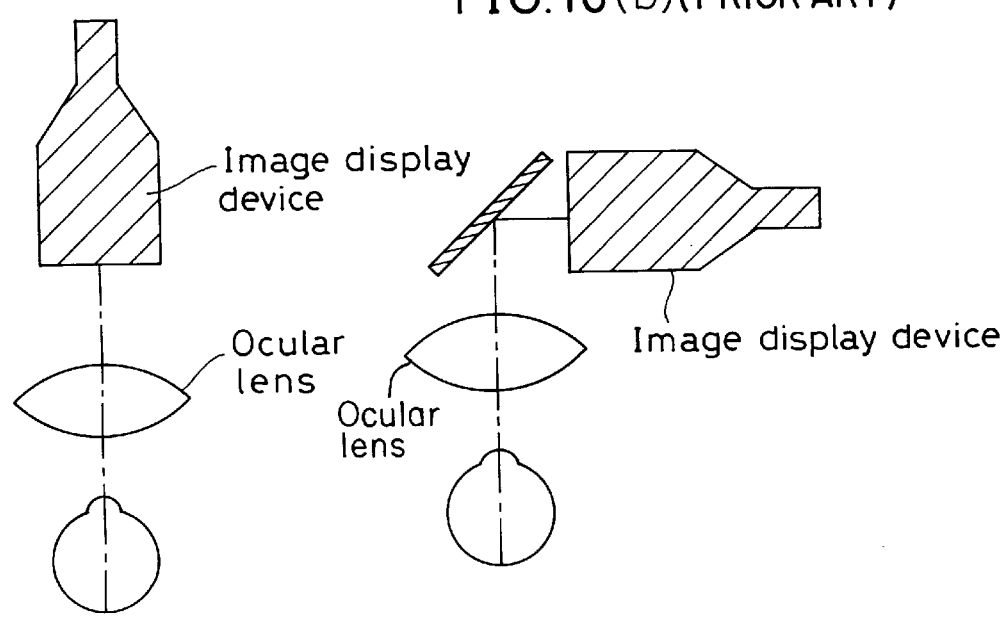

OPTICAL SYSTEM AND OPTICAL APPARATUS

This is a division of Application Ser. No. 08/697,059, filed Aug. 20, 1996 now U.S. Pat. No. 5,812,323.

BACKGROUND OF THE INVENTION

The present invention relates to an image display apparatus and, more particularly, to a head- or face-mounted image display apparatus that can be retained on the observer's head or face.

As an example of conventional head- or face-mounted image display apparatus, an image display apparatus disclosed in Japanese Patent Application Unexamined Publication (KOKAI) No. 3-101709 (1991) is known. FIG. 14(a) shows the entire optical system of the conventional image display apparatus, and FIG. 14(b) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of conventional image display apparatus. In this apparatus, as shown in FIG. 15, an image of a CRT is transmitted through a relay optical system to form an intermediate image, and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIGS. 16(a) and 16(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 17, an image of an image display device is transferred to a curved object surface by an image transfer device, and the image transferred to the object surface is projected in the air by a toric reflector.

U.S. Reissued Pat. No. 27,356 discloses another type of conventional image display apparatus. As shown in FIG. 18, the apparatus is an ocular optical system designed to project an object surface onto an exit pupil by a semitransparent concave mirror and a semitransparent plane mirror.

In image display apparatuses of the type wherein an image of an image display device is relayed, as shown in FIGS. 14(a), 14(b) and 15, however, several lenses must be used as a relay optical system in addition to an ocular optical system, regardless of the type of ocular optical system. Consequently, the optical path length increases, and the optical system increases in both size and weight.

In a case where only the ocular optical system shown in FIG. 14(a) is used, as shown in FIG. 14(b), positive power resides in only the reflecting surface that has a concave surface directed toward the observer. Therefore, large negative field curvature is produced as shown by reference character P1 in the figure.

In a layout such as that shown in FIG. 16, the amount to which the apparatus projects from the observer's face undesirably increases. Further, because an image display device and an illumination optical system are attached to the projecting portion of the apparatus, the apparatus becomes increasingly large in size and heavy in weight.

Because a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head. Further, when the observer moves or turns with the apparatus fitted to his/her head, the apparatus may collide with something.

That is, it is important for a head-mounted image display apparatus to be small in size and light in weight. An essential factor in determining the size and weight of the apparatus is the arrangement of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle for observation is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 17.

In a coaxial ocular optical system in which an object surface is projected onto an observer's pupil by using a semitransparent concave mirror and a semitransparent plane mirror, as shown in FIG. 18, because two semitransparent surfaces are used, the brightness of the image is reduced to as low a level as $\frac{1}{16}$, even in the case of a theoretical value. Further, because field curvature that is produced by the semitransparent concave mirror is corrected by curving the object surface itself, it is difficult to use a flat display, e.g. an LCD (Liquid Crystal Display), as an image display device.

SUMMARY OF THE INVENTION

In view of the above-described problems of the conventional techniques, an object of the present invention is to provide an image display apparatus which enables observation of a clear image at a wide field angle with substantially no reduction in the brightness of the observation image, and which is extremely small in size and light in weight and hence unlikely to cause the observer to be fatigued.

To attain the above-described object, the present invention provides an image display apparatus which includes an image display device for displaying an image, and an ocular optical system for projecting the image displayed by the image display device and for leading the projected image to an observer's eyeball. The ocular optical system has at least three surfaces, and a space formed by the at least three surfaces is filled with a medium having a refractive index larger than 1. The at least three surfaces are, in the order from the observer's eyeball toward the image display device, a first surface which is a refracting surface, a second surface which is decentered or tilted with respect to an observer's visual axis and serves as both an internally reflecting surface and a refracting surface, and a third surface which is a reflecting surface of positive power facing the second surface. Internal reflection at the second surface is total reflection.

In this case, the first surface of the ocular optical system is desirably tilted or decentered with respect to the observer's visual axis.

In addition, the present invention provides an image display apparatus which includes an image display device for displaying an image, and an ocular optical system for projecting the image displayed by the image display device and for leading the projected image to an observer's eyeball. The ocular optical system has a decentered optical element, and at least one optical surface having a refracting or reflecting action. The decentered optical element and the at least one optical surface are disposed in an optical path extending from the image display device to the observer's eyeball. The decentered optical element has at least three surfaces, and a space formed by the at least three surfaces is filled with a medium having a refractive index larger than 1. The at least three surfaces are, in the order from the observer's eyeball toward the image display device, a first surface which is a refracting surface, a second surface which is decentered or tilted with respect to an observer's visual axis and serves as both an internally reflecting surface and a refracting surface, and a third surface which is a surface of positive power facing the second surface. Internal reflection at the second surface is total reflection.

The operation of the above-described image display apparatus according to the present invention will be explained below. The following explanation will be given on the basis of backward ray tracing in which light rays are traced from the observer's pupil position toward the image display device for the convenience of designing an optical system.

The basic arrangement of the present invention is as follows: An image display apparatus includes an image display device for displaying an image, and an ocular optical system for projecting the image displayed by the image display device and for leading the projected image to an observer's eyeball. The ocular optical system has at least three surfaces, and a space formed by the at least three surfaces is filled with a medium having a refractive index larger than 1. The at least three surfaces are, in the order from the observer's eyeball toward the image display device, a first surface which is a refracting surface, a second surface which is decentered or tilted with respect to an observer's visual axis and serves as both an internally reflecting surface and a refracting surface, and a third surface which is a reflecting surface of positive power facing the second surface. Internal reflection at the second surface is total reflection. In the sequence of backward ray tracing from the observer's eyeball side, surface Nos. are serially given to the three surfaces in the order, the first surface, the second surface, the third surface, and the second surface.

The reason for adopting the above-described arrangement is as follows: If the first to third surfaces are optical elements independent of each other, exceedingly high accuracy is demanded for the angle, distance, etc. when these optical elements are disposed. Consequently, it becomes difficult to assemble the optical system, and the productivity reduces. The second and third surfaces, which are internal reflecting surfaces of the optical element constituting the ocular optical system, produce no chromatic aberration. Refraction at the second surface produces minimal chromatic aberration because the inclination angle of light rays to the surface is small. Accordingly, chromatic aberration in the ocular optical system of the present invention occurs at only the first surface; it is relatively small as a whole. If an ordinary reflecting mirror is used as the second surface, it is necessary to use a half-mirror, which reflects a part of incident light rays and transmits a part of them, in order to assign reflecting and transmitting actions to the second surface as in the present invention. However, the use of a half-mirror causes the brightness of an image to be observed to reduce to about ¼ before the image reaches the observer's eyeball. Therefore, the first to third surfaces are integrally formed as one unit, thereby facilitating the assembly and achieving an improvement in productivity. Further, total reflection is utilized as the internal reflection at the second surface, thereby enabling observation of an image which is clear and bright as far as the edges of the image field at a wide field angle despite a compact structure.

Advantageous effects achieved by the above-described arrangement will be explained below.

First, the refracting action at the first surface makes it possible to minimize the height of extra-axial rays when reflected by the second surface. Consequently, it becomes possible to construct the optical element in a compact form. In other words, it becomes possible to set a wide field angle despite a compact optical element.

Further, the optical system is arranged such that the internal reflection at the second surface satisfies the condition for total reflection, and the third surface is assigned principal positive power, thereby succeeding in preventing the occurrence of comatic aberration at the third surface.

In general, a concave mirror having strong power produces strong negative comatic aberration. In the case of a concave mirror decentered or tilted with respect to the optical axis, the amount of comatic aberration increases as the inclination angle of the concave mirror becomes larger. However, it is necessary in order to widen the field angle to increase the inclination angle of a reflecting surface which lies immediately in front of the observer's eyeball because the image display device and the observer's head would otherwise interfere with each other. Therefore, the ocular optical system according to the present invention is arranged such that the second surface, which is a reflecting surface immediately in front of the eyeball, has a large reflection angle to perform total reflection and has no strong power. On the other hand, the third surface is given principal positive power, and the angle of reflection at this concave mirror is reduced. This makes it possible to minimize comatic aberration due to the decentration.

Further, unlike a conventional arrangement in which an observation image of an image display device is formed in the air as a real intermediate image by a relay optical system and the image is projected into an observer's eyeball as an enlarged image by an ocular optical system, the ocular optical system according to the present invention projects an image of an image display device directly into an observer's eyeball as an enlarged image, thereby enabling the observer to view the enlarged image of the image display device as a virtual image. Accordingly, the optical system can be constructed with a reduced number of optical elements.

The first surface of the above-described ocular optical system is desirably tilted or decentered with respect to the observer's visual axis. Tilting or decentering the first surface makes it possible to correct comatic aberrations asymmetrically introduced into an image which lies closer to the image display device relative to the observer's visual axis and into an image which lies on the opposite side, and also possible to dispose the image display device on a plane which is approximately perpendicular to the optical axis reflected by the third surface. This is effective when an image display device which is inferior in viewing angle characteristics is used.

The third surface of the ocular optical system is desirably tilted or decentered with respect to the observer's visual axis. Light rays totally reflected by the second surface are reflected again by the third surface, which is a concave mirror. Because the direction of reflection at the third surface tilts closer to the image display device than the incident light from the second surface, it is possible to allow the reflected light to emanate forwardly from the second surface and to dispose the image display device above the slant surface of the second surface. Accordingly, the whole apparatus can be constructed in a thin form. Moreover, with the above-described arrangement, the incident angle of light rays to the second surface reduces. Therefore, it is possible to minimize chromatic aberration occurring when light rays are refracted by the second surface.

If two of the three surfaces constituting the optical element of the ocular optical system have a finite radius of curvature, it becomes possible to correct spherical and comatic aberrations produced by the eccentrically tilted third surface. Thus, it is possible to provide the observer with a clear observation image having a wide exit pupil diameter and a wide observation field angle.

In a case where two of the three surfaces of the ocular optical system have a finite radius of curvature, if the first surface has a finite radius of curvature in addition to the second surface and it has positive power, the effect of refraction of light rays by the first surface is enhanced. Therefore, the size of the ocular optical system can be further reduced. Alternatively, the field angle can be widened. Further, because the height of subordinate rays reduces, it becomes possible to minimize comatic aberrations produced by the second surface, particularly higher-order comatic aberrations.

In a case where the second surface has a finite radius of curvature in addition to the third surface and it has positive power, it becomes easy to satisfy the condition for total reflection of extra-axial rays at the second surface, and it is possible to realize an exceedingly wide field angle.

It is useful for aberration correction that any one of the first, second and third surfaces of the ocular optical system is a decentered aspherical surface.

Let us define a coordinate system as follows: With the observer's iris position defined as the origin, the direction of the observer's visual axis is taken as a Z-axis, where the direction toward the ocular optical system from the origin is defined as a positive direction. The vertical direction (as viewed from the observer's eyeball) which perpendicularly intersects the observer's visual axis is taken as a Y-axis, where the upward direction is defined as a position direction. The horizontal direction (as viewed from the observer's eyeball) which perpendicularly intersects the observer's visual axis is taken as an X-axis, where the leftward direction is defined as a positive direction. In this case, the above-described arrangement, in which any one of the first, second and third surfaces of the ocular optical system is a decentered aspherical surface, is an important condition for correcting comatic aberrations, particularly higher-order comatic aberrations and coma flare, produced by the second surface decentered in the direction Y or tilted from the visual axis.

In an image display apparatus that uses an ocular optical system of the type having a decentered or tilted reflecting surface in front of an observer's eyeball as in the present invention, light rays are obliquely incident on the reflecting surface even on the observer's visual axis, causing comatic aberration to occur. The comatic aberration increases as the inclination angle of the reflecting surface increases. However, the amount of decentration or the angle of inclination must be increased to a certain extent in order to realize a compact and wide-field image display apparatus because the image display device and the optical path would otherwise interfere with each other. Thus, it is difficult to ensure an observation image of wide field angle unless the decentration or the inclination is increased to a certain extent.

Accordingly, as the field angle of an image display apparatus becomes wider and the size thereof becomes smaller, the inclination angle of the reflecting surface becomes larger. As a result, how to correct higher-order comatic aberrations becomes a serious problem.

To correct such complicated comatic aberrations, a decentered aspherical surface is used as any one of the first, second and third surfaces constituting the ocular optical system. By doing so, the power of the optical system can be made asymmetric with respect to the visual axis. Further, the effect of the aspherical surface can be utilized for off-axis aberration. Accordingly, it becomes possible to effectively correct comatic aberrations, including axial aberration.

It is important that any one of the first, second and third surfaces of the ocular optical system should be an anamorphic surface. That is, any one of the three surfaces should be a surface in which the radius of curvature in the YZ-plane and the curvature radius in the XZ-plane, which perpendicularly intersects the YZ-plane, are different from each other.

The above is a condition for correcting aberration which occurs because the second surface is decentered or tilted with respect to the visual axis. In general, if a spherical surface is decentered, the curvature relative to light rays incident on the surface in the plane of incidence and that in a plane perpendicularly intersecting the incidence plane differ from each other. Therefore, in an ocular optical system where a reflecting surface is disposed in front of an observer's eyeball in such a manner as to be decentered or tilted with respect to the visual axis as in the present invention, an image on the visual axis lying in the center of the observation image is also astigmatically aberrated for the reason stated above. In order to correct the axial astigmatism, it is important that any one of the first, second and third surfaces of the ocular optical system should be formed so that the curvature radius in the plane of incidence and that in a plane perpendicularly intersecting the incidence plane are different from each other.

Assuming that $R_y$ is the radius of curvature in the YZ-plane of any one of the first, second and third surfaces of the ocular optical system, which is an anamorphic surface, and $R_x$ is the radius of curvature in the XZ-plane of that surface, it is preferable to satisfy the following condition:

$$R_y/R_x \geq 1 \quad (1)$$

The above expression (1) is a condition for correcting aberrations, particularly axial and other astigmatic aberrations, which occur because the second surface is tilted with respect to the visual axis. In general, as the field angle becomes larger, higher-order astigmatic aberrations appear. In a convex lens system, as the field angle becomes larger, the meridional image increases in the negative direction, whereas the sagittal image increases in the positive direction. In order to correct these astigmatic aberrations, it is necessary to arrange the optical system such that the power in the meridional plane is reduced, whereas the power in the sagittal plane is increased. Accordingly, it is preferable from the viewpoint of aberration correction that the curvature radius of at least one anamorphic surface should be increased in the direction Y and reduced in the direction X.

Further, it is desirable to satisfy the following condition:

$$30° < \alpha < 70° \quad (2)$$

where α is the angle between the second surface of the ocular optical system and the visual axis.

This is a condition for disposing the ocular optical system and the image display device of the image display apparatus according to the present invention at appropriate positions. If α is not larger than the lower limit of the condition (2), i.e. 30°, light rays after reflection have a reflection angle of 90° or more with respect to the visual axis. Consequently, the image-formation positions of the upper and lower extra-axial rays on the image field are exceedingly separated from each other, which is not realistic. Conversely, if α is not smaller than the upper limit of the condition (2), i.e. 70°, the reflection angle at the second surface becomes exceedingly small, and it becomes impossible to satisfy the condition for total reflection.

Further, it is important that the display surface of the image display device should be tilted with respect to the visual axis. In a case where a refracting surface or a reflecting surface which constitutes an optical element is decentered or tilted, the refraction or reflection angle of light rays from the pupil at the refracting or reflecting surface may vary according to the image height, causing the image surface to be tilted with respect to the visual axis. In such a case, the inclination of the image surface can be corrected by tilting the display surface of the image display device with respect to the visual axis.

Incidentally, as the field angle of an image display apparatus widens and the size thereof decreases, the inclination angle of the second surface, which is the first reflecting surface, increases, and higher-order comatic aberrations produced thereby increase. Further, astigmatism that is produced by the inclination of the surface also increases. Accordingly, it may be difficult to satisfactorily correct these aberrations by only a decentered optical element in which a space formed by three surfaces is filled with a medium having a refractive index larger than 1, and in which the three surfaces are, in the order from the observer's eyeball toward the image display device, a first surface which is a refracting surface, a second surface which is decentered or tilted with respect to an observer's visual axis and serves as both an internally reflecting surface and a refracting surface, and a third surface which is a reflecting surface of positive power facing the second surface, in which internal reflection at the second surface is total reflection.

Therefore, at least one optical surface having a refracting or reflecting action is disposed, in addition to the above-described decentered optical element, between the observer's eyeball and the image display device. This enables even more effective correction of aberrations produced in the ocular optical system.

In the decentered optical element of the present invention, the second surface and the internally reflecting surface of the third surface, which is subsequent to the second surface, are reflecting surfaces. Therefore, no chromatic aberration is produced at these surfaces. Further, at the second surface, which lies in close proximity to the image display device, the principal ray is approximately parallel to the optical axis. Therefore, the second surface produces minimal chromatic aberration. Consequently, chromatic aberration produced by the first surface, which is a refracting surface, is dominant in the ocular optical system. It should, however, be noted that, when the third surface is a refracting surface, chromatic aberration is also produced by the third surface. In a wide-field optical system such as that in the present invention, lateral chromatic aberration appears more markedly than axial chromatic aberration. That is, it is important to correct lateral chromatic aberration produced by the first surface, and it is possible to display an image which is clearer and of higher resolution by correcting the lateral chromatic aberration.

Accordingly, the ocular optical system is preferably arranged such that the decentered optical element, together with at least one optical surface having a refracting or reflecting action, is disposed between the observer's eyeball and the image display device. By doing so, optical elements constituting the ocular optical system can be composed of two or more different mediums, and it becomes possible to correct the lateral chromatic aberration by virtue of the difference in Abbe's number between these mediums.

As has been described above, it is important in the ocular optical system of the present invention to correct chromatic aberration produced by the first surface of the decentered optical element. The chromatic aberration can be corrected by forming the above-described at least one optical surface from a surface which produces chromatic aberration which is approximately equal in quantity but opposite in sign to the chromatic aberration produced by the first surface.

In a case where the above-described at least one optical surface is disposed between the observer's eyeball and the first surface of the decentered optical element, and the optical surface has positive refracting power, the beam diameter at the second surface of the decentered optical element becomes small, and hence higher-order comatic aberrations reduce. Therefore, it is possible to observe a clear image as far as the edges of the image display area of the image display device. Further, because a principal ray at the edge of the image is refracted by the at least one optical surface having positive refracting power, the height of the ray incident on the decentered optical system can be reduced. Therefore, it becomes possible to set a larger field angle than in a case where the decentered optical system alone is used.

In a case where the above-described at least one optical surface is disposed between the first to third surfaces of the decentered optical element, the decentered optical element is composed of two different mediums, as has been described above; this is useful to correct chromatic aberration.

In a case where the above-described at least one optical surface is disposed between the decentered optical element and the image display device, if the optical surface has negative power, it is possible to reduce the inclination angle of extra-axial principal rays to the display device. This is effective when an image display device which is inferior in viewing angle characteristics at the edges of the image display area is used.

By decentering the above-described at least one optical surface with respect to the visual axis, it is possible to correct comatic aberrations asymmetrically introduced into an image which lies closer to the image display device as viewed from the visual axis and into an image which lies on the opposite side, and also possible to allow the optical axis to lie approximately perpendicular to a plane on which the image display device is disposed.

By using a cemented lens to form the above-described at least one optical surface, lateral chromatic aberration produced in the decentered optical system can be corrected; this is useful to ensure a clearer image and a wider field angle.

It should be noted that it becomes possible for the observer to see a stable observation image by providing a device for positioning both the image display device and the ocular optical system with respect to the observer's head.

By allowing both the image display device and the ocular optical system to be fitted to the observer's head with a supporting device, it becomes possible for the observer to see the observation image in a desired posture and from a desired direction.

Further, it becomes possible for the observer to see the observation image with both eyes without fatigue by providing a device for supporting at least two image display apparatuses as described above at a predetermined spacing. Further, if images with a disparity therebetween are displayed on the right and left image display surfaces, and these images are observed with both eyes, it is possible to enjoy viewing a stereoscopic image.

Further, if the optical system according to the present invention is arranged to form an image of an object at infinity with the image display device surface in the ocular optical system defined as an image surface, the optical system according to the present invention can be used as an imaging optical system, e.g. a finder optical system for a camera such as that shown in FIG. 12.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 14($a$) and 14($b$) show an optical system of a conventional image display apparatus.

FIG. 15 shows an optical system of another conventional image display apparatus.

FIGS. 16($a$) and 16($b$) show an optical system of still another conventional image display apparatus.

DESCRIPTION OF THE PREFERRED EMBODIMENTS

Examples 1 to 10 of the image display apparatus according to the present invention will be described below with reference to FIGS. 1 to 10, which are sectional views of image display apparatuses designed for a single eye according to Examples 1 to 10.

Figure 1:
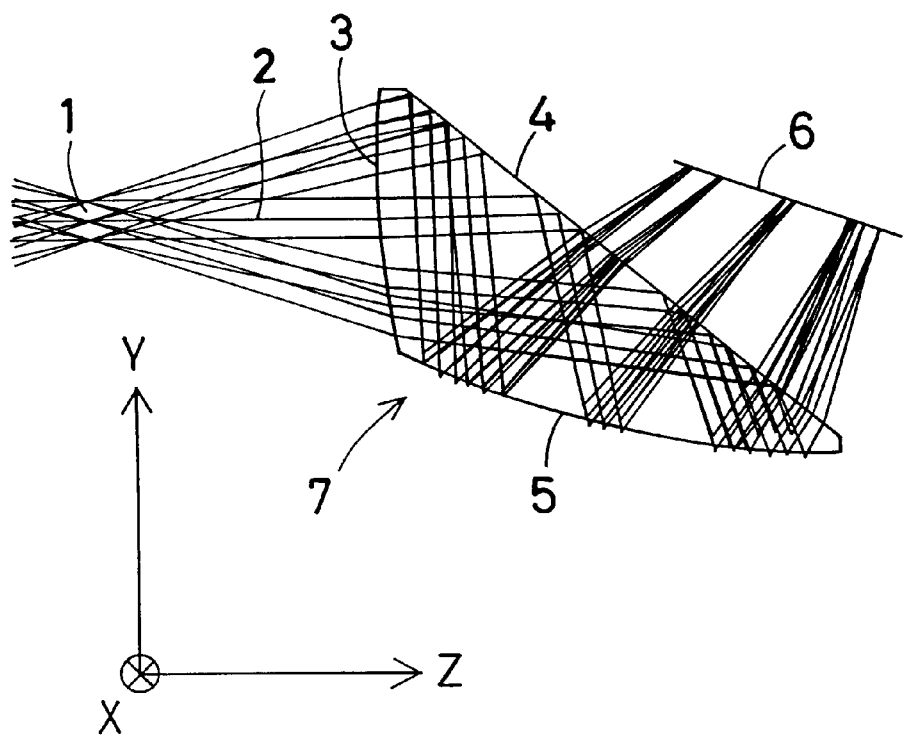
FIG. 1 illustrates an optical ray trace of Example 1 of the image display apparatus according to the present invention.

Constituent parameters of Examples 1 to 10 will be shown later. In the following description, surface Nos. are shown as ordinal numbers in backward tracing from an observer's pupil position 1 toward an image display device 6. A coordinate system is defined as follows: As shown in FIG. 1, with the observer's pupil position 1 defined as the origin, the direction of an observer's visual axis 2 is taken as a Z-axis, where the direction toward an ocular optical system 7 from the origin is defined as a positive direction. The vertical direction (as viewed from the observer's eyeball) which perpendicularly intersects the observer's visual axis 2 is taken as a Y-axis, where the upward direction is defined as a position direction. The horizontal direction (as viewed from the observer's eyeball) which perpendicularly intersects the observer's visual axis 2 is taken as an X-axis, where the leftward direction is defined as a positive direction. That is, the plane of the figure is defined as a YZ-plane, and a plane which is perpendicular to the plane of the figure is defined as an XZ-plane. Further, it is assumed that the optical axis is bent in the YZ-plane, which is parallel to the plane of the figure.

In the constituent parameters (shown later), regarding each surface for which eccentricities Y and z and tilt angle $\theta$ are shown, the eccentricity Y is a distance by which the vertex of the surface decenters in the Y-axis direction from the surface No. 1 (pupil position 1), which is a reference surface. The eccentricity Z is a distance by which the vertex of the surface decenters in the Z-axis direction from the surface No. 1. The tilt angle $\theta$ is the angle of inclination of the central axis of the surface from the Z-axis. In this case, positive $\theta$ means counterclockwise rotation. It should be noted that a surface without indication of eccentricities Y, Z and tilt angle $\theta$ is coaxial with respect to the preceding surface.

Regarding surface separations, the surface separation of the surface No. 2 is the distance from the surface No. 1 along the Z-axis direction, and a point on the surface No. 2 that lies on the Z-axis is defined as a reference point. A point which decenters from the reference point in the direction Y by the given eccentricity is the vertex of the surface No. 2. Regarding the coaxial portion, the surface separation is the axial distance from the surface concerned to the next surface. It should be noted that surface separations are shown with the direction of backward tracing along the optical axis defined as a positive direction.

The non-rotationally symmetric aspherical configuration of each surface may be expressed in the coordinate system defining the surface as follows:

$$Z = [(X^2/R_x) + (Y^2/R_y)] / [1 +$$
$$\{1 - (1 + K_x)(X^2/R_x^2) - (1 + K_y)(Y^2/R_y^2)\}^{1/2}] +$$
$$AR[(1 - AP)X^2 + (1 + AP)Y^2]^2 + BR[(1 - BP)X^2 + (1 + BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

It should be noted that the refractive index of the medium between a pair of surfaces is expressed by the refractive index for the spectral d-line. Lengths are given in millimeters.

The following examples are all image display apparatuses for the right eye. An image display apparatus for the left eye can be realized by disposing the constituent optical elements of each example in symmetrical relation to the apparatus for the right eye with respect to the YZ-plane.

In an actual apparatus, needless to say, the direction in which the optical axis is bent by the ocular optical system may be any of the upward, downward and sideward directions of the observer.

In each sectional view, reference numeral 1 denotes an observer's pupil position, 2 an observer's visual axis, 3 a first surface of an ocular optical system, 4 a second surface of the ocular optical system, 5 a third surface of the ocular optical system, and 6 an image display device. Reference numeral 7 denotes the ocular optical system having the first, second and third surfaces 3, 4 and 5. Reference numeral 8 denotes a decentered optical element, and reference numerals 9 and 9' denote optical surfaces.

The actual path of light rays in each example is as follows: In Example 1, for instance, a bundle of light rays emitted from the image display device 6 enters the ocular optical system 7 while being refracted by the second surface 4 of the ocular optical system 7. The incident ray bundle is internally reflected by the third surface 5 and totally reflected by the second surface 4. Then, the ray bundle is incident on the first surface 3 and refracted thereby so as to be projected into the observer's eyeball with the observer's iris position or eyeball rolling center as the exit pupil 1.

EXAMPLE 1

In this example, as shown in the sectional view of FIG. 1, the horizontal field angle is 48°, while the vertical field angle is 36.9°, and the pupil diameter is 4 millimeters. In the constituent parameters (shown later), the surface Nos. 2 and 4 are anamorphic aspherical surfaces, and the surfaces Nos. 3 and 5 are plane surfaces.

EXAMPLE 2

Figure 2:
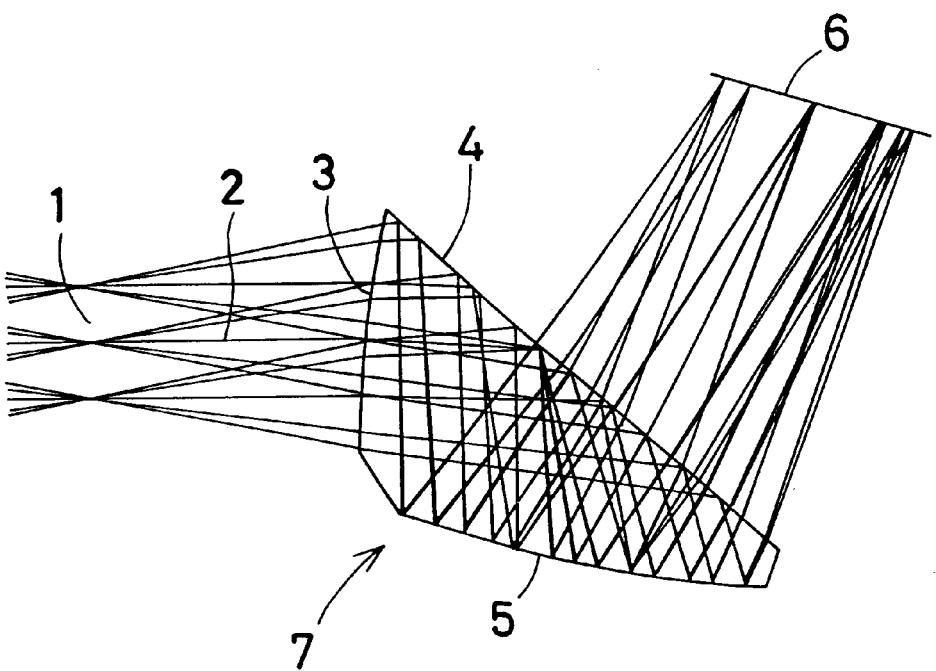
FIG. 2 illustrates an optical ray trace of Example 2 of the image display apparatus according to the present invention.

In this example, as shown in the sectional view of FIG. 2, the horizontal field angle is 30°, while the vertical field angle is 22.7°, and the pupil diameter is 12 millimeters. In the constituent parameters (shown later), the surface Nos. 2 to 5 are spherical surfaces.

EXAMPLE 3

Figure 3:
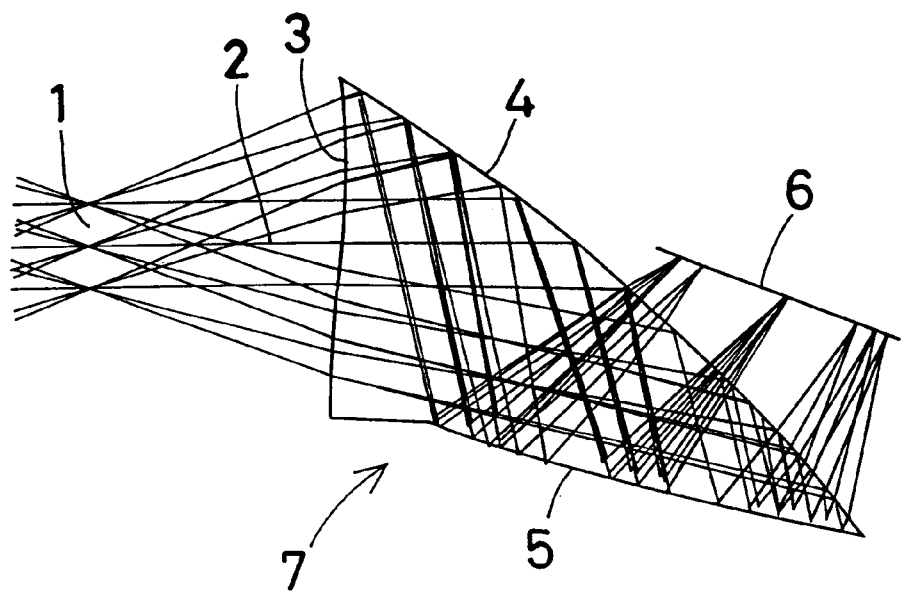
FIG. 3 illustrates an optical ray trace of Example 3 of the image display apparatus according to the present invention.

In this example, as shown in the sectional view of FIG. 3, the horizontal field angle is 55°, while the vertical field angle is 42.7°, and the pupil diameter is 4 millimeters. In the constituent parameters (shown later), the surface Nos. 2 to 5 are anamorphic aspherical surfaces.

EXAMPLE 4

Figure 4:
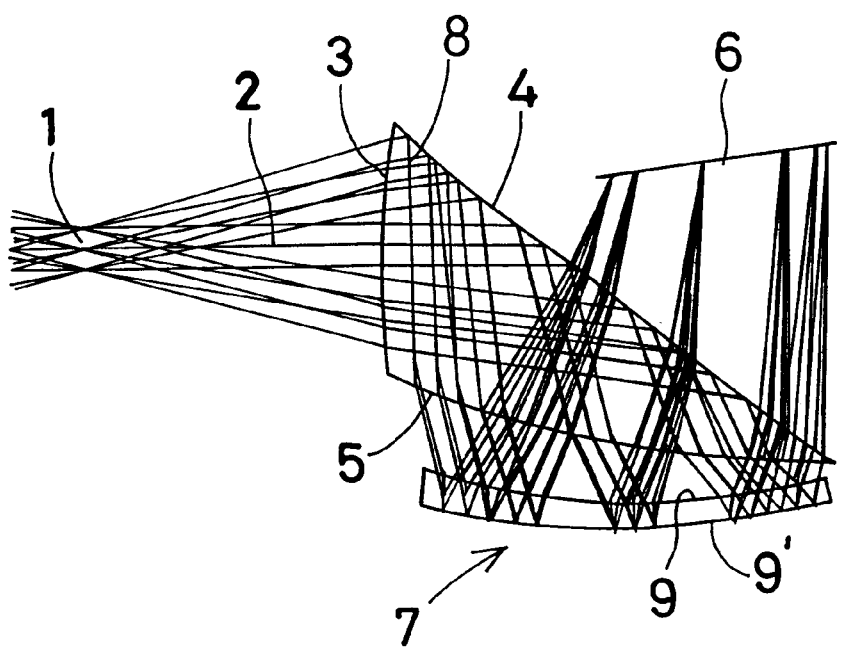
FIG. 4 illustrates an optical ray trace of Example 4 of the image display apparatus according to the present invention.

In this example, as shown in the sectional view of FIG. 4, the horizontal field angle is 40°, while the vertical field angle is 30.5°, and the pupil diameter is 4 millimeters. In the constituent parameters (shown later), the surface Nos. 2, 4, 5, 7 and 8 are spherical surfaces, and the surface Nos. 3, 6 and 9 are anamorphic aspherical surfaces. Optical surfaces are defined by the surface Nos. 5 to 7 and decentered with respect to the visual axis 2.

EXAMPLE 5

Figure 5:
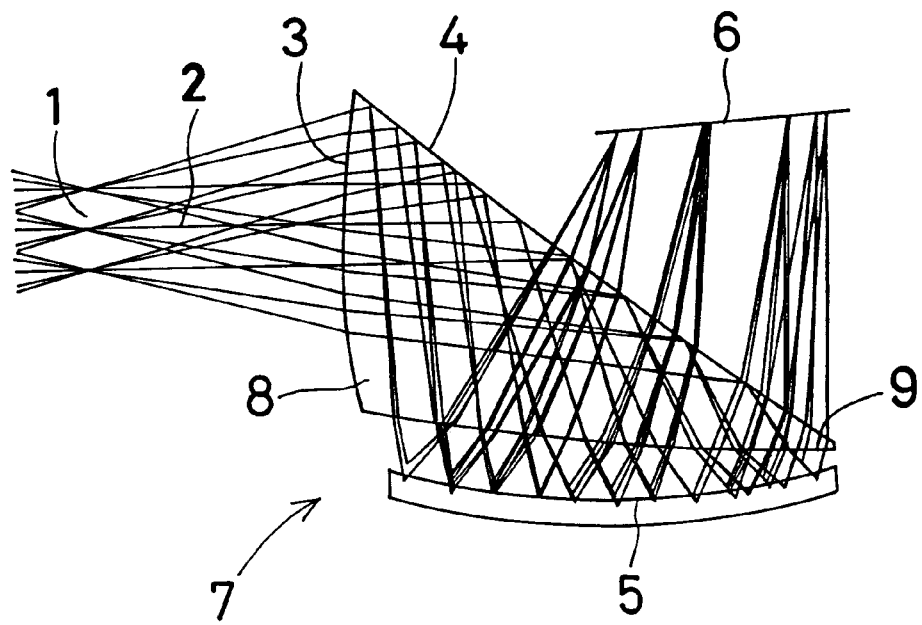
FIG. 5 illustrates an optical ray trace of Example 5 of the image display apparatus according to the present invention.

In this example, as shown in the sectional view of FIG. 5, the horizontal field angle is 40°, while the vertical field angle is 30.5°, and the pupil diameter is 8 millimeters. In the constituent parameters (shown later), the surface Nos. 4 and 6 are spherical surfaces, and the surface Nos. 2, 3, 5 and 7 are anamorphic aspherical surfaces. Optical surfaces are defined by the surface Nos. 4 and 6 and decentered with respect to the visual axis 2.

EXAMPLE 6

Figure 6:
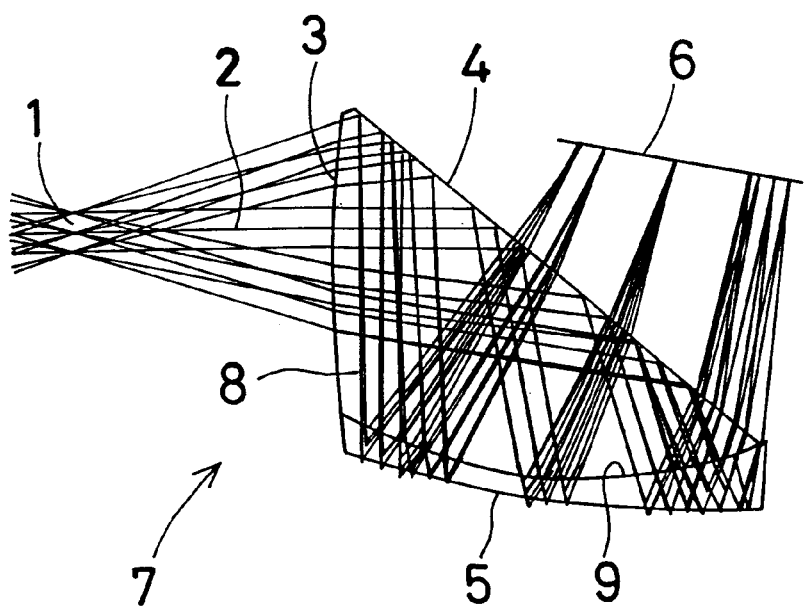
FIG. 6 illustrates an optical ray trace of Example 6 of the image display apparatus according to the present invention.

In this example, as shown in the sectional view of FIG. 6, the horizontal field angle is 48°, while the vertical field angle is 36.9°, and the pupil diameter is 4 millimeters. In the constituent parameters (shown later), the surface Nos. 2, 4 and 6 are spherical surfaces, and the surface Nos. 3, 5 and 7 are anamorphic aspherical surfaces. Optical surfaces are defined by the surface Nos. 4 and 6 and decentered with respect to the visual axis 2.

EXAMPLE 7

Figure 7:
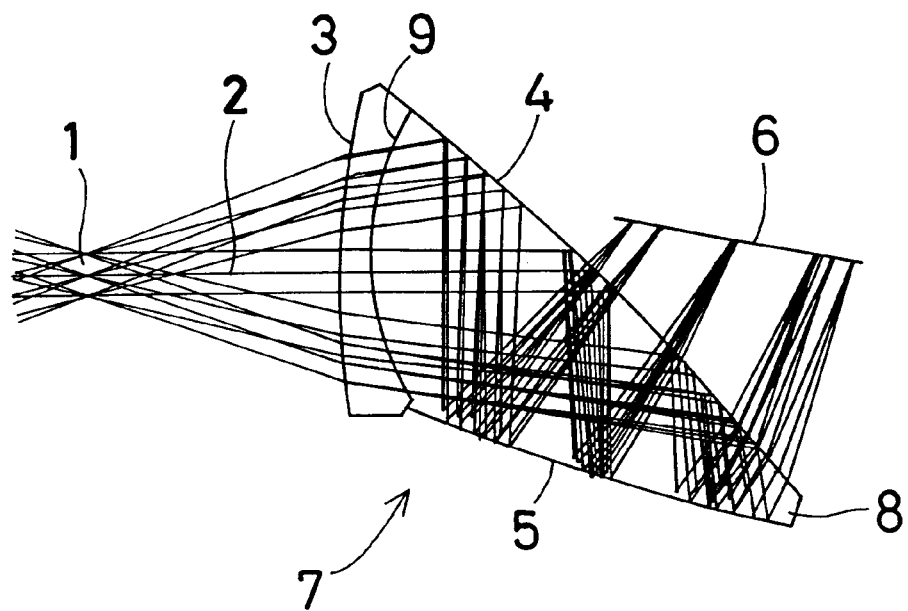
FIG. 7 illustrates an optical ray trace of Example 7 of the image display apparatus according to the present invention.

In this example, as shown in the sectional view of FIG. 7, the horizontal field angle is 50°, while the vertical field angle is 38.5°, and the pupil diameter is 4 millimeters. In the constituent parameters (shown later), the surface Nos. 2 and 3 are spherical surfaces, and the surface Nos. 4, 5 and 6 are anamorphic aspherical surfaces. An optical surface is defined by the surface No. 3 and decentered with respect to the visual axis 2.

EXAMPLE 8

Figure 8:
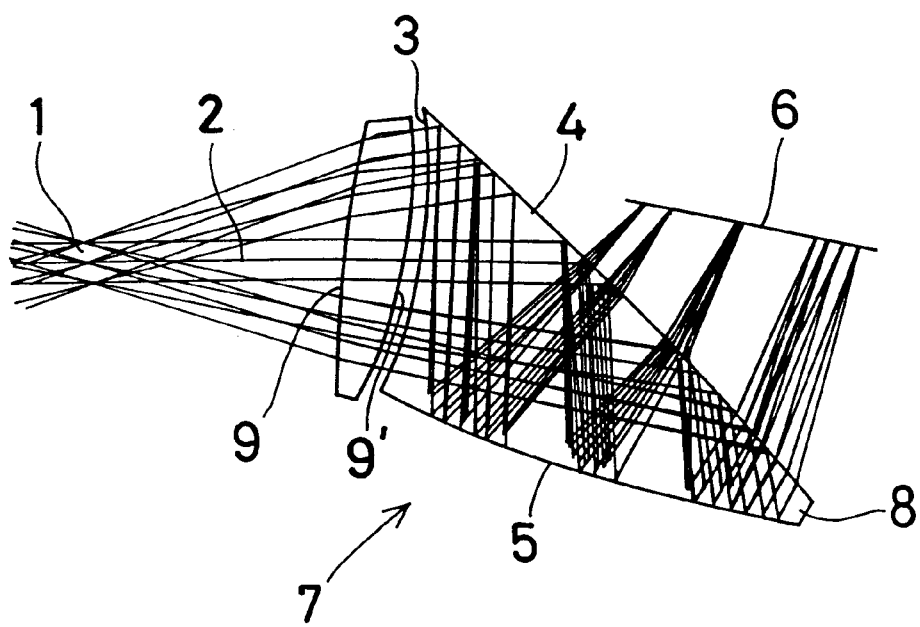
FIG. 8 illustrates an optical ray trace of Example 8 of the image display apparatus according to the present invention.

In this example, as shown in the sectional view of FIG. 8, the horizontal field angle is 50°, while the vertical field angle is 38.5°, and the pupil diameter is 4 millimeters. In the constituent parameters (shown later), the surface Nos. 2, 3 and 4 are spherical surfaces, and the surface Nos. 5, 6 and 7 are anamorphic aspherical surfaces. Optical surfaces are formed by a positive lens defined by the surface Nos. 2 and 3. The positive lens is disposed between the decentered optical element 8 and the observer's eyeball 1 in such a manner as to be decentered with respect to the visual axis 2.

EXAMPLE 9

Figure 9:
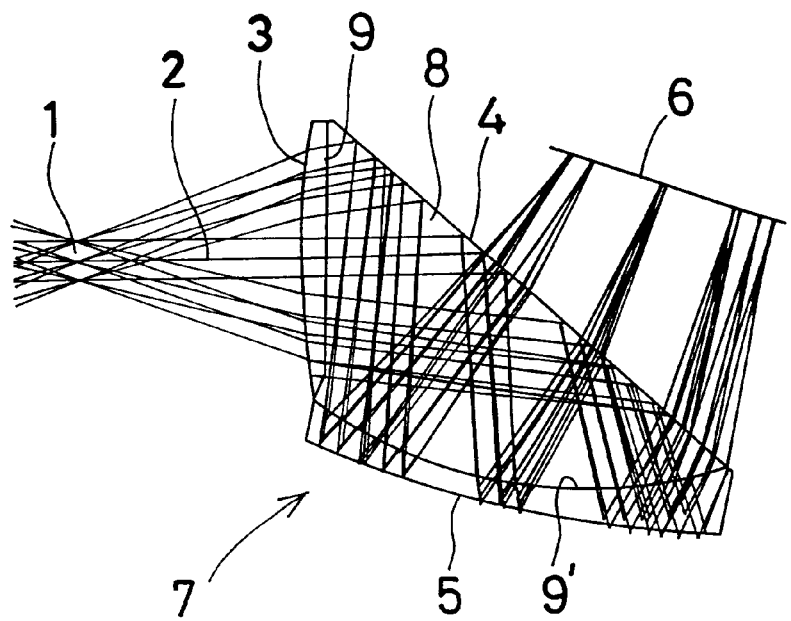
FIG. 9 illustrates an optical ray trace of Example 9 of the image display apparatus according to the present invention.

In this example, as shown in the sectional view of FIG. 9, the horizontal field angle is 52°, while the vertical field angle is 40.2°, and the pupil diameter is 4 millimeters. In the constituent parameters (shown later), the surface Nos. 2, 3, 5 and 7 are spherical surfaces, and the surface Nos. 4, 6 and 8 are anamorphic aspherical surfaces. Optical surfaces are defined by the surface Nos. 3, 5 and 7 and decentered with respect to the visual axis 2.

EXAMPLE 10

Figure 10:
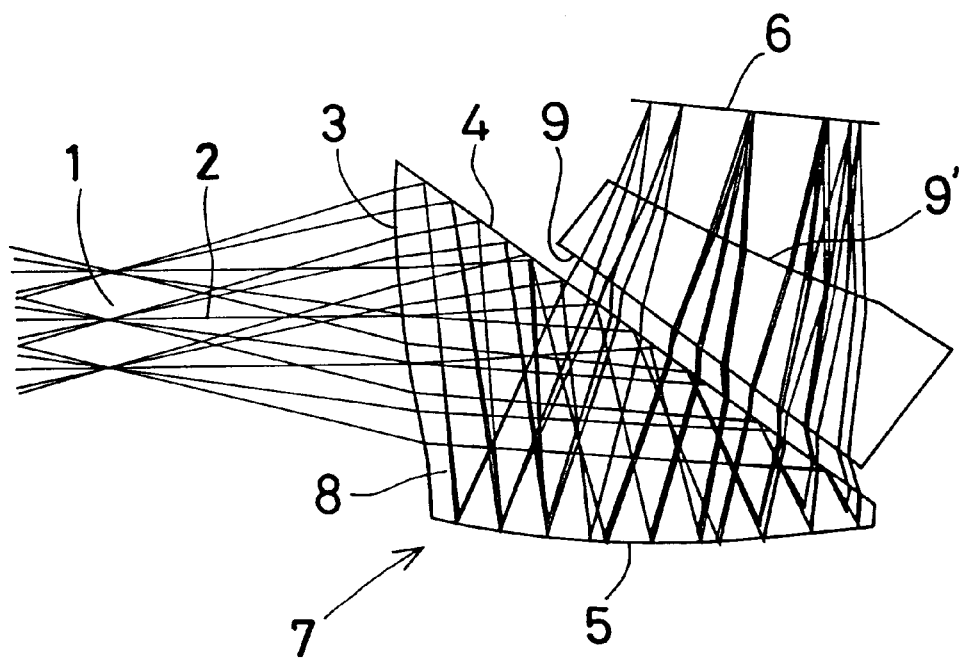
FIG. 10 illustrates an optical ray trace of Example 10 of the image display apparatus according to the present invention.

In this example, as shown in the sectional view of FIG. 10, the horizontal field angle is 40°, while the vertical field angle is 30.5°, and the pupil diameter is 10 millimeters. In the constituent parameters (shown later), the surface Nos. 2 to 7 are spherical surfaces. Optical surfaces are defined by the surface Nos. 6 and 7 and decentered with respect to the visual axis 2. In this example, the optical surfaces are formed as a single lens disposed between the image display device 6 and the decentered optical element 8. However, the single lens may be replaced by a cemented lens.

Constituent parameters of the above-described Examples 1 to 10 are as follows:

| Surface No. | Radius of curvature | Surface separation | | Refractive index (Eccentricity) | | Abbe's No. (Tilt angle) |
|---|---|---|---|---|---|---|
| | | Example 1 | | | | |
| 1 | ∞(pupil) | 30.042 | | | | |
| 2 | $R_y$ 81.816 | | | 1.4870 | | 70.40 |
| | $R_x$ 44.764 | | Y | −0.759 | θ | 3.44° |
| | $K_y$ 2.586634 | | | | | |
| | $K_x$ −.6206961 | | | | | |
| | AR −1.12255 × $10^{-6}$ | | | | | |
| | BR 7.46253 × $10^{-10}$ | | | | | |
| | AP 0.845407 | | | | | |
| | BP 0.790479 | | | | | |
| 3 | ∞ | | | 1.4870 | | 70.40 |
| | | | Y | 14.068 | θ | 51.23° |
| | | | Z | 32.634 | | |
| 4 | $R_y$ 111.203 | | | 1.4870 | | 70.40 |
| | $R_x$ 125.686 | | Y | −13.468 | θ | 62.15° |
| | $K_y$ −0.399652 | | Z | 29.862 | | |
| | $K_x$ 2.873441 | | | | | |
| | AR 4.34333 × $10^{-8}$ | | | | | |
| | BR 2.28072 × $10^{-12}$ | | | | | |
| | AP −1.7788 | | | | | |
| | BP 0.946485 | | | | | |
| 5 | ∞ | | Y | 14.068 | θ | 51.23° |
| | | | Z | 32.634 | | |
| 6 | (display device) | | Y | 1.410 | θ | 71.51° |
| | | | Z | 75.077 | | |

(1) $R_y/R_x$ = 1.828
(2) α = 38.77°

| | | Example 2 | | | | |
|---|---|---|---|---|---|---|
| 1 | ∞(pupil) | 28.912 | | | | |
| 2 | 149.553 | | | 1.4870 | | 70.40 |
| | | | Y | −21.668 | θ | 1.50° |
| 3 | 941.611 | | | 1.4870 | | 70.40 |
| | | | Y | −0.102 | θ | 47.77° |
| | | | Z | 47.230 | | |
| 4 | 149.800 | | | 1.4870 | | 70.40 |
| | | | Y | −18.949 | θ | 70.67° |
| | | | Z | 33.163 | | |
| 5 | 941.611 | | Y | −0.102 | θ | 47.77° |
| | | | Z | 47.230 | | |
| 6 | (display device) | | Y | 24.665 | θ | 73.70° |
| | | | Z | 78.142 | | |

(1) $R_y 2/R_x 2$ = 1
(2) α = 42.23°

| | | Example 3 | | | | |
|---|---|---|---|---|---|---|
| 1 | ∞(pupil) | 21.322 | | | | |
| 2 | $R_y$ 143.843 | | | 1.4922 | | 57.50 |
| | $R_x$ 29.666 | | Y | −22.583 | θ | −0.80° |
| | $K_y$ −10.678912 | | | | | |
| | $K_x$ −4.18065 | | | | | |
| | AR −1.35839 × $10^{-8}$ | | | | | |
| | BR −5.14664 × $10^{-10}$ | | | | | |
| | AP 8.40197 | | | | | |
| | BP −0.552947 | | | | | |
| 3 | $R_y$ −184.192 | | | 1.4922 | | 57.50 |
| | $R_x$ −456.655 | | Y | 5.564 | θ | 53.46° |
| | $K_y$ −2.917159 | | Z | 39.811 | | |
| | $K_x$ −5.539583 | | | | | |
| | AR −8.14666 × $10^{-8}$ | | | | | |
| | BR 2.56706 × $10^{-12}$ | | | | | |
| | AP 0.356072 | | | | | |
| | BP −0.517181 | | | | | |
| 4 | $R_y$ 70.860 | | | 1.4922 | | 57.50 |
| | $R_x$ 166.306 | | Y | −13.573 | θ | 60.00° |

-continued

| Surface No. | Radius of curvature | Surface separation | | Refractive index (Eccentricity) | | Abbe's No. (Tilt angle) |
|---|---|---|---|---|---|---|
| | $K_y$ −8.773779 | | Z | 22.549 | | |
| | $K_x$ −1.385752 | | | | | |
| | AR $3.69119 \times 10^{-7}$ | | | | | |
| | BR $-1.17043 \times 10^{-12}$ | | | | | |
| | AP −1.26444 | | | | | |
| | BP 1.53099 | | | | | |
| 5 | $R_y$ −184.192 | | Y | 5.564 | θ | 53.46° |
| | $R_x$ −456.655 | | Z | 39.811 | | |
| | $K_y$ −2.917159 | | | | | |
| | $K_x$ −5.539583 | | | | | |
| | AR $-8.14666 \times 10^{-8}$ | | | | | |
| | BR $2.56706 \times 10^{-12}$ | | | | | |
| | AP 0.356072 | | | | | |
| | BP −0.517181 | | | | | |
| 6 | (display device) | | Y | −6.789 | θ | 68.00° |
| | | | Z | 68.196 | | |

(1) $R_y/R_x = 4.849$
(2) $\alpha = 36.54°$

Example 4

| Surface No. | Radius of curvature | Surface separation | | Refractive index (Eccentricity) | | Abbe's No. (Tilt angle) |
|---|---|---|---|---|---|---|
| 1 | ∞(pupil) | 29.185 | | | | |
| 2 | 102.985 | | | 1.5092 | | 68.07 |
| | | | Y | 0.923 | θ | −2.81° |
| 3 | $R_y$ 491.360 | | | 1.5092 | | 68.07 |
| | $R_x$ ∞ | | Y | 9.366 | θ | 49.18° |
| | $K_y$ −23.545228 | | Z | 33.561 | | |
| | $K_x$ 0.000000 | | | | | |
| | AR $-3.12497 \times 10^{-10}$ | | | | | |
| | BR $3.17327 \times 10^{-12}$ | | | | | |
| | AP −3.99521 | | | | | |
| | BP −0.577359 | | | | | |
| 4 | 111.602 | | Y | −18.553 | θ | 74.81° |
| | | | Z | 45.079 | | |
| 5 | 63.706 | | | 1.6619 | | 32.68 |
| | | | Y | −24.901 | θ | 76.76° |
| | | | Z | 39.978 | | |
| 6 | $R_y$ 67.336 | | | 1.6619 | | 32.68 |
| | $R_x$ 82.918 | | Y | −19.488 | θ | 60.27° |
| | $K_y$ −0.453741 | | Z | 16.092 | | |
| | $K_x$ −0.466346 | | | | | |
| | AR $4.6317 \times 10^{-8}$ | | | | | |
| | BR $1.71366 \times 10^{-12}$ | | | | | |
| | AP −0.308474 | | | | | |
| | BP −1.22665 | | | | | |
| 7 | 63.706 | | Y | −24.901 | θ | 76.76° |
| | | | Z | 39.978 | | |
| 8 | 111.602 | | | 1.5092 | | 68.07 |
| | | | Y | −18.553 | θ | 74.81° |
| | | | Z | 45.079 | | |
| 9 | $R_y$ 491.360 | | Y | 9.366 | θ | 49.18° |
| | $R_x$ ∞ | | Z | 33.561 | | |
| | $K_y$ −23.545228 | | | | | |
| | $K_x$ 0.000000 | | | | | |
| | AR $-3.12497 \times 10^{-8}$ | | | | | |
| | BR $3.17327 \times 10^{-12}$ | | | | | |
| | AP −3.99521 | | | | | |
| | BP −0.577359 | | | | | |
| 10 | (display device) | | Y | 7.910 | θ | 97.72° |
| | | | Z | 60.951 | | |

(1) $R_y 2/R_x 2 = 0.812$
(2) $\alpha = 40.82°$

Example 5

| Surface No. | Radius of curvature | Surface separation | | Refractive index (Eccentricity) | | Abbe's No. (Tilt angle) |
|---|---|---|---|---|---|---|
| 1 | ∞(pupil) | 24.904 | | | | |
| 2 | $R_y$ 93.146 | | | 1.4870 | | 70.40 |
| | $R_x$ 93.100 | | Y | −2.281 | θ | −1.71° |
| | $K_y$ 0.164655 | | | | | |
| | $K_x$ −0.845638 | | | | | |
| | AR $-7.83979 \times 10^{-8}$ | | | | | |
| | BR $4.49774 \times 10^{-10}$ | | | | | |
| | AP 0.222841 | | | | | |
| | BP 0.223382 | | | | | |
| 3 | $R_y$ 463.262 | | | 1.4870 | | 70.40 |
| | $R_x$ ∞ | | Y | −21.248 | θ | 47.76° |
| | $K_y$ 10.958 | | Z | 17.229 | | |
| | $K_x$ 0.000000 | | | | | |

-continued

| Surface No. | Radius of curvature | Surface separation | | Refractive index (Eccentricity) | | Abbe's No. (Tilt angle) |
|---|---|---|---|---|---|---|
| | AR −3.20926 × 10⁻¹⁰ | | | | | |
| | BR −7.75816 × 10⁻¹¹ | | | | | |
| | AP −11.4842 | | | | | |
| | BP −1.18875 | | | | | |
| 4 | 236.753 | | Y | −20.560 | θ | 80.17° |
| | | | Z | 33.297 | | |
| 5 | R$_y$ 60.993 | | Y | −16.708 | θ | 53.97° |
| | R$_x$ 93.509 | | Z | 12.262 | | |
| | K$_y$ −0.417798 | | | | | |
| | K$_x$ −0.124282 | | | | | |
| | AR −1.82409 × 10⁻⁹ | | | | | |
| | BR −2.29964 × 10⁻¹¹ | | | | | |
| | AP 5.70288 | | | | | |
| | BP −1.42015 | | | | | |
| 6 | 236.753 | | | 1.4870 | | 70.40 |
| | | | Y | −20.560 | θ | 80.17° |
| | | | Z | 33.297 | | |
| 7 | R$_y$ 463.262 | | Y | −21.248 | θ | 47.76° |
| | R$_x$ ∞ | | Z | 17.229 | | |
| | K$_y$ 10.958 | | | | | |
| | K$_x$ 0.000000 | | | | | |
| | AR −3.20926 × 10⁻¹⁰ | | | | | |
| | BR −7.75816 × 10⁻¹¹ | | | | | |
| | AP −11.4842 | | | | | |
| | BP −1.18875 | | | | | |
| 8 | (display device) | | Y | 8.904 | θ | 93.09° |
| | | | Z | 62.046 | | |

(1) R$_y$ 2/R$_x$ 2 = 1.000
(2) α = 42.24°

| | | Example 6 | | | | |
|---|---|---|---|---|---|---|
| 1 | ∞(pupil) | 25.116 | | | | |
| 2 | 108.105 | | | 1.5779 | | 60.23 |
| | | | Y | 2.027 | θ | −3.83° |
| 3 | R$_y$ 1676.967 | | | 1.5779 | | 60.23 |
| | R$_x$ ∞ | | Y | 7.253 | θ | 48.56° |
| | K$_y$ −1.135218 | | Z | 32.312 | | |
| | K$_x$ 0.000000 | | | | | |
| | AR −1.8564 × 10⁻¹⁰ | | | | | |
| | BR −2.95405 × 10⁻¹³ | | | | | |
| | AP −8.1079 | | | | | |
| | BP −2.4482 | | | | | |
| 4 | 49.089 | | | 1.6619 | | 32.68 |
| | | | Y | −25.370 | θ | 76.20° |
| | | | Z | 38.548 | | |
| 5 | R$_y$ 97.125 | | | 1.6619 | | 32.68 |
| | R$_x$ 100.373 | | Y | −13.327 | θ | 56.84° |
| | K$_y$ −0.514166 | | Z | 5.687 | | |
| | K$_x$ −0.739895 | | | | | |
| | AR 5.54015 × 10⁻⁸ | | | | | |
| | BR −5.22115 × 10⁻¹² | | | | | |
| | AP 98.8859 | | | | | |
| | BP 0.121884 | | | | | |
| 6 | 49.089 | | | 1.5779 | | 60.23 |
| | | | Y | −25.370 | θ | 76.20° |
| | | | Z | 38.548 | | |
| 7 | R$_y$ 1676.967 | | Y | 7.253 | θ | 48.56° |
| | R$_x$ ∞ | | Z | 32.312 | | |
| | K$_y$ −1.135218 | | | | | |
| | K$_x$ 0.000000 | | | | | |
| | AR −1.8564 × 10⁻¹⁰ | | | | | |
| | BR −2.95405 × 10⁻¹³ | | | | | |
| | AP −8.1079 | | | | | |
| | BP −2.4482 | | | | | |
| 8 | (display device) | | Y | 5.841 | θ | 78.81° |
| | | | Z | 59.335 | | |

(1) R$_y$/R$_x$ = 0.968
(2) α = 41.44°

| | | Example 7 | | | | |
|---|---|---|---|---|---|---|
| 1 | ∞(pupil) | 24.954 | | | | |
| 2 | 82.210 | | | 1.6524 | | 33.40 |
| | | | Y | −1.588 | θ | −1.10° |
| 3 | 27.869 | | | 1.6200 | | 60.30 |
| | | | Y | 6.895 | θ | −12.09° |
| | | | Z | 28.621 | | |

-continued

| Surface No. | Radius of curvature | Surface separation | | Refractive index (Eccentricity) | | Abbe's No. (Tilt angle) |
|---|---|---|---|---|---|---|
| 4 | $R_y$ −304.883 | | | 1.6200 | | 60.30 |
| | $R_x$ −199.708 | | Y | 20.855 | θ | 50.44° |
| | $K_y$ −27.32181 | | Z | 25.995 | | |
| | $K_x$ 0.000000 | | | | | |
| | AR −2.38693 × 10$^{-8}$ | | | | | |
| | BR −4.01613 × 10$^{-12}$ | | | | | |
| | AP 0.331362 | | | | | |
| | BP −0.774091 | | | | | |
| 5 | $R_y$ 140.065 | | | 1.6200 | | 60.30 |
| | $R_x$ 117.775 | | Y | −6.911 | θ | 60.00° |
| | $K_y$ −2.336694 | | Z | 18.219 | | |
| | $K_x$ −7.921931 | | | | | |
| | AR −2.36277 × 10$^{-8}$ | | | | | |
| | BR −1.22629 × 10$^{-12}$ | | | | | |
| | AP 0.136585 | | | | | |
| | BP 1.26004 | | | | | |
| 6 | $R_y$ −304.883 | | Y | 20.855 | θ | 50.44° |
| | $R_x$ −199.708 | | Z | 25.995 | | |
| | $K_y$ −27.32181 | | | | | |
| | $K_x$ 0.000000 | | | | | |
| | AR −2.38693 × 10$^{-8}$ | | | | | |
| | BR −4.01613 × 10$^{-12}$ | | | | | |
| | AP 0.331362 | | | | | |
| | BP −0.774091 | | | | | |
| 7 | (display device) | | Y | 2.249 | θ | 79.24° |
| | | | Z | 63.702 | | |

(1) $R_y 2/R_x 2 = 1.189$
(2) $\alpha = 39.56°$

Example 8

| | | | | | | |
|---|---|---|---|---|---|---|
| 1 | ∞(pupil) | 24.280 | | | | |
| 2 | 106.771 | | | 1.4870 | | 70.40 |
| | | | Y | −5.860 | θ | −5.48° |
| 3 | −43.532 | | | | | |
| | | | Y | 7.136 | θ | −1.02° |
| | | | Z | 31.861 | | |
| 4 | −49.540 | | | 1.6200 | | 60.30 |
| | | | Y | 4.827 | θ | −3.99° |
| | | | Z | 33.709 | | |
| 5 | $R_y$ −344.333 | | | 1.6200 | | 60.30 |
| | $R_x$ −221.534 | | Y | 1.7071 | θ | 47.61° |
| | $K_y$ −29.506325 | | Z | 29.985 | | |
| | $K_x$ 0.000000 | | | | | |
| | AR −6.62719 × 10$^{-9}$ | | | | | |
| | BR 8.7999 × 10$^{-12}$ | | | | | |
| | AP 0.3146 | | | | | |
| | BP −0.608616 | | | | | |
| 6 | $R_y$ 134.853 | | | 1.6200 | | 60.30 |
| | $R_x$ 111.312 | | Y | −10.136 | θ | 60.00° |
| | $K_y$ −2.228243 | | Z | 22.094 | | |
| | $K_x$ −5.058892 | | | | | |
| | AR 1.03782 × 10$^{-9}$ | | | | | |
| | BR −5.43772 × 10$^{-13}$ | | | | | |
| | AP −4.95485 | | | | | |
| | BP 1.6409 | | | | | |
| 7 | $R_y$ −344.333 | | Y | 17.071 | θ | 47.61° |
| | $R_x$ −221.534 | | Z | 29.985 | | |
| | $K_y$ −29.506325 | | | | | |
| | $K_x$ 0.000000 | | | | | |
| | AR −6.62719 × 10$^{-9}$ | | | | | |
| | BR 8.7999 × 10$^{-12}$ | | | | | |
| | AP 0.3146 | | | | | |
| | BP −0.608616 | | | | | |
| 8 | (display device) | | Y | 2.256 | θ | 77.94° |
| | | | Z | 64.333 | | |

(1) $R_y 2/R_x 2 = 1.211$
(2) $\alpha = 42.39°$

Example 9

| | | | | | | |
|---|---|---|---|---|---|---|
| 1 | ∞(pupil) | 23.327 | | | | |
| 2 | 104.277 | | | 1.6200 | | 60.30 |
| | | | Y | 6.005 | | −4.77° |
| 3 | −977.974 | | | 1.7201 | | 46.70 |
| | | | Y | 12.778 | θ | −3.00° |
| | | | Z | 26.314 | | |
| 4 | $R_y$ 731.548 | | | 1.7201 | | 46.70 |

-continued

| Surface No. | Radius of curvature | Surface separation | | Refractive index (Eccentricity) | | Abbe's No. (Tilt angle) |
|---|---|---|---|---|---|---|
| | $R_x$ ∞ | | Y | 2.779 | θ | 45.59° |
| | $K_y$ 0.000000 | | Z | 38.174 | | |
| | $K_x$ 0.000000 | | | | | |
| | AR −1.00706 × 10$^{-8}$ | | | | | |
| | BR −3.2973 × 10$^{-11}$ | | | | | |
| | AP −1.9345 | | | | | |
| | BP −1.41996 | | | | | |
| 5 | 45.954 | | | 1.7550 | | 27.60 |
| | | | Y | −24.307 | θ | 74.19° |
| | | | Z | 39.647 | | |
| 6 | $R_y$ 99.662 | | | 1.7550 | | 27.60 |
| | $R_x$ 114.270 | | Y | −10.489 | θ | 53.63° |
| | $K_y$ −0.894536 | | Z | 8.547 | | |
| | $K_x$ −0.71734 | | | | | |
| | AR 6.52729 × 10$^{-8}$ | | | | | |
| | BR −3.70088 × 10$^{-11}$ | | | | | |
| | AP 0.224738 | | | | | |
| | BP −0.957649 | | | | | |
| 7 | 45.954 | | | 1.7201 | | 46.70 |
| | | | Y | −24.307 | θ | 27.60° |
| | | | Z | 39.647 | | |
| 8 | $R_y$ 731.548 | | Y | 2.779 | θ | 45.59° |
| | $R_x$ ∞ | | Z | 38.174 | | |
| | $K_y$ 0.000000 | | | | | |
| | $K_x$ 0.000000 | | | | | |
| | AR −1.00706 × 10$^{-8}$ | | | | | |
| | BR −3.2973 × 10$^{-11}$ | | | | | |
| | AP −1.9345 | | | | | |
| | BP −1.41996 | | | | | |
| 9 | (display device) | | Y | 5.982 | θ | 70.67° |
| | | | Z | 60.426 | | |

(1) $R_y 2/R_x 2 = 0.872$
(2) $\alpha = 44.41°$

Example 10

| Surface No. | Radius of curvature | Surface separation | | Refractive index (Eccentricity) | | Abbe's No. (Tilt angle) |
|---|---|---|---|---|---|---|
| 1 | ∞(pupil) | 29.657 | | | | |
| 2 | 122.705 | | | 1.5422 | | 65.21 |
| | | | Y | 11.498 | θ | −1.01° |
| 3 | 1482.183 | | | 1.5422 | | 65.21 |
| | | | Y | 30.172 | θ | 50.00° |
| | | | Z | 12.368 | | |
| 4 | 118.749 | | | 1.5422 | | 65.21 |
| | | | Y | −17.459 | θ | 69.49° |
| | | | Z | 17.231 | | |
| 5 | 1482.183 | | Y | 30.172 | θ | 50.00° |
| | | | Z | 12.368 | | |
| 6 | 1540.704 | 7.041 | | 1.6200 | | 36.30 |
| | | | Y | 19.919 | θ | 49.92° |
| | | | Z | 29.590 | | |
| 7 | 148.781 | | | | | |
| 8 | (display device) | | Y | 19.920 | θ | 83.32° |
| | | | Z | 66.180 | | |

(1) $R_y 2/R_x 2 = 1$
(2) $\alpha = 40.00°$

Figure 11A:
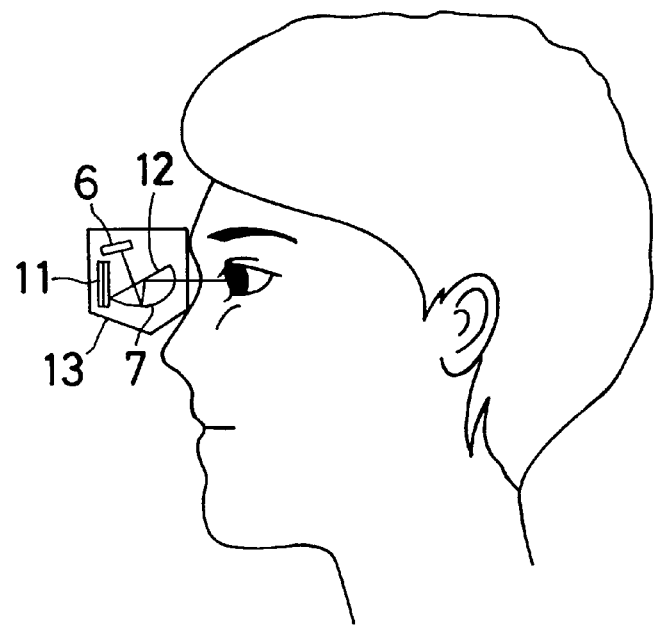
FIGS. 11($a$) and 11($b$) are sectional and perspective views showing a head-mounted image display apparatus according to the present invention.
Figure 11B:
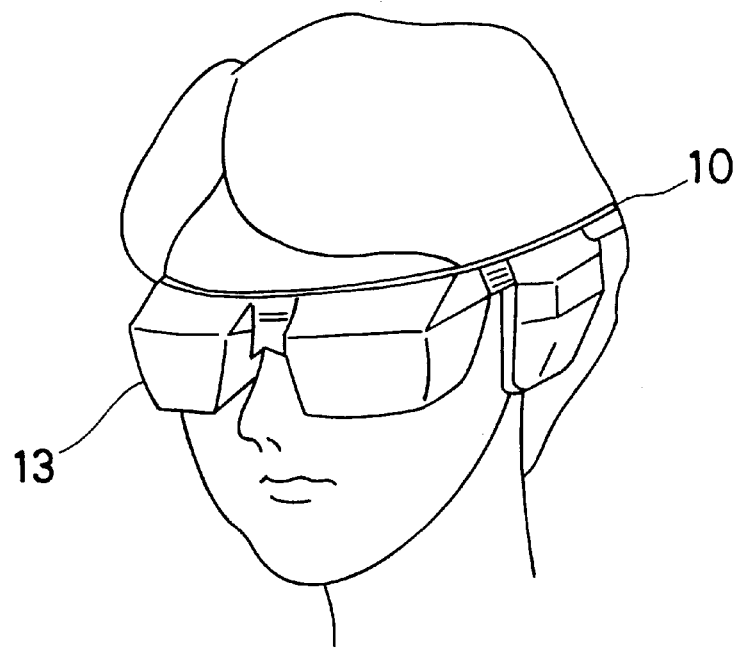

Although examples in which the optical apparatus according to the present invention is applied to an image display apparatus have been described above, it should be noted that the present invention is not necessarily limited to these examples, and that various modifications may be imparted thereto. To arrange the optical apparatus according to the present invention as a head-mounted image display apparatus (HMD) 13, as shown in the sectional view of FIG. 11(*a*) and the perspective view of FIG. 11(*b*), the HMD 13 is fitted to the observer's head by using a headband 10, for example, which is attached to the HMD 13. In this example of use, the HMD 13 may be arranged such that the second surface 2 of the ocular optical system is formed by using a semitransparent mirror (half-mirror) 12, and a liquid crystal shutter 11 is provided in front of the half-mirror 12, thereby enabling an outside world image to be selectively observed or superimposed on the image of the image display device 6.

Figure 12:
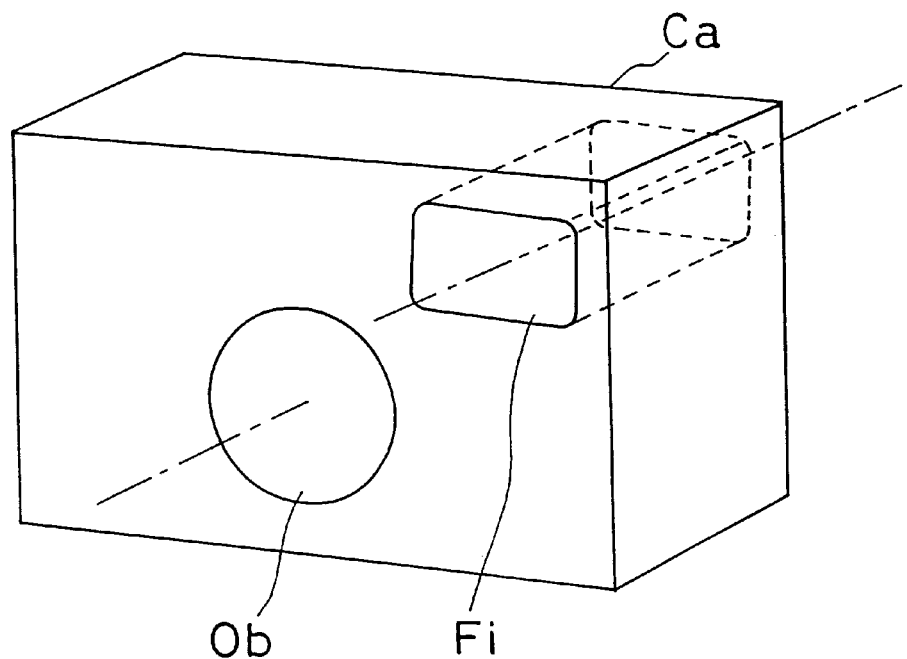
FIG. 12 shows an arrangement in which an optical apparatus according to the present invention is used as an imaging optical system.
Figure 13:
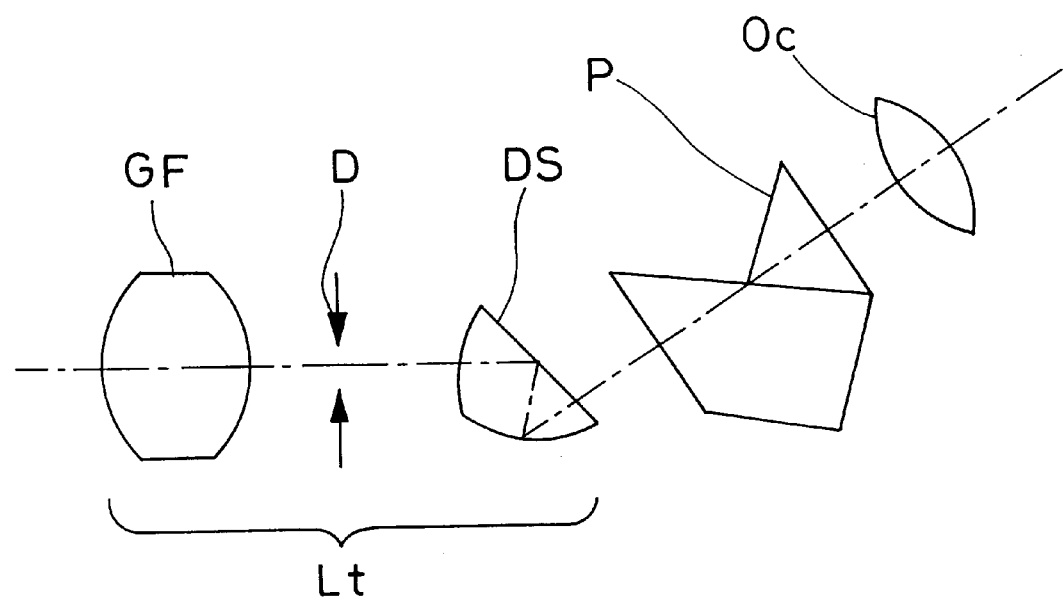
FIG. 13 shows an arrangement of an optical system in which an optical apparatus according to the present invention is used as an imaging optical system.
Figure 17:
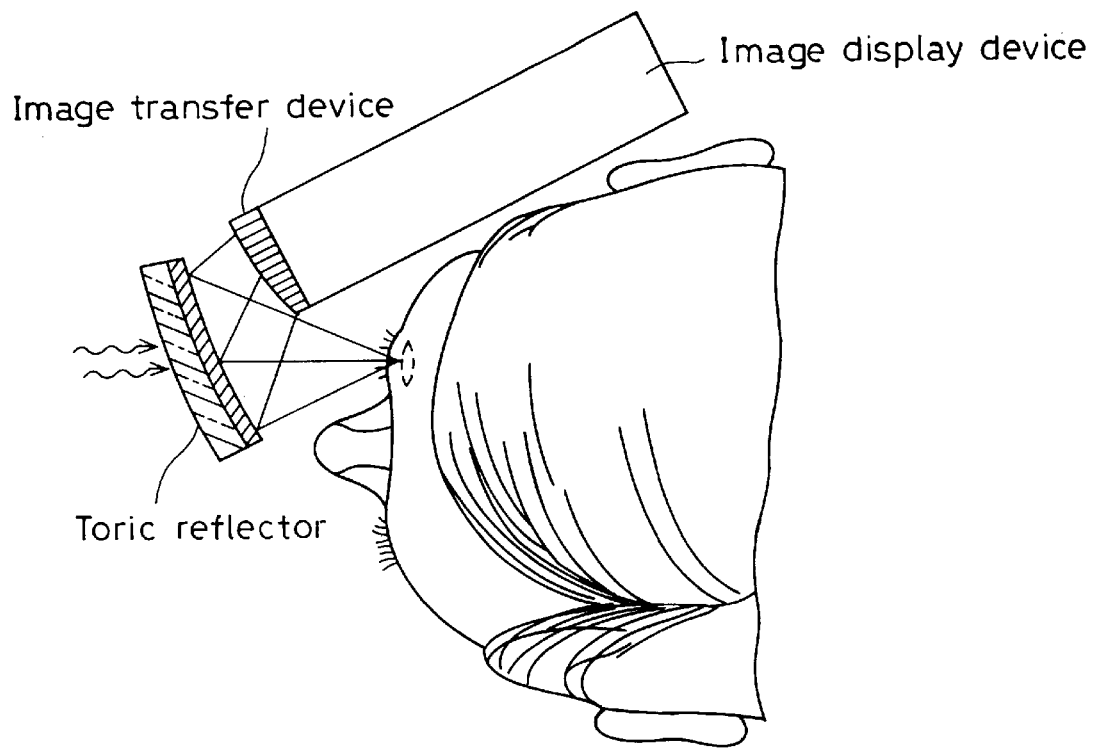
FIG. 17 shows an optical system of a further conventional image display apparatus.
Figure 18:
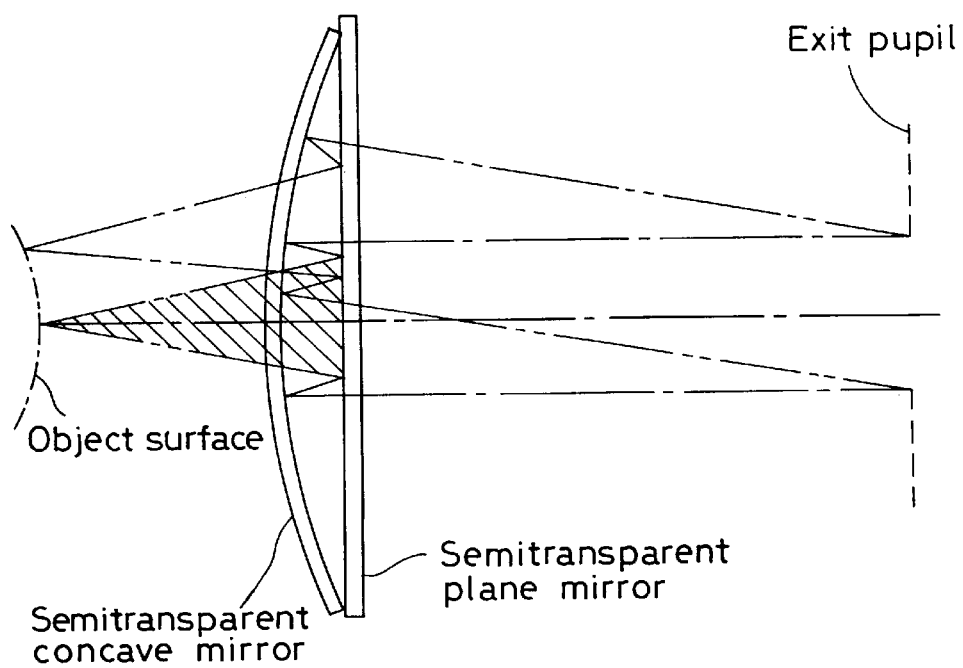
FIG. 18 shows an optical system of a still further conventional image display apparatus.

Further, the ocular optical system of the image display apparatus according to the present invention can be used as an imaging optical system. For example, as shown in the perspective view of FIG. 12, the ocular optical system may be used in a finder optical system $F_i$ of a compact camera $C_a$ in which a photographic optical system $O_b$ and the finder optical system $F_i$ are provided separately in parallel to each other. FIG. 13 shows an arrangement of an optical system in a case where the ocular optical system of the present invention is used as such an imaging optical system. As illustrated, the ocular optical system DS of the present invention is disposed behind a front lens group GF and an aperture diaphragm D, thereby constituting an objective optical system $L_r$. An image that is formed by the objective optical system $L_r$ is erected by a Porro prism P, in which there are four reflections, provided at the observer side of the objective optical system $L_r$, thereby enabling an erect image to be observed through an ocular lens $O_c$.

As will be clear from the foregoing description, it is possible according to the present invention to provide an image display apparatus which has a wide field angle and is extremely small in size and light in weight.

What we claim is:

1. An image-forming optical system which forms an image of an object, said image-forming optical system comprising at least one prism member, wherein said prism member has a first surface, a second surface, and a third surface, said first surface, second surface and third surface facing each other across a medium having a refractive index (n) larger than 1 (n>1), so that light rays from an object side of said prism member enter said prism member by passing through said first surface and are reflected by said second surface and further reflected by said third surface, and the reflected light rays exit from said prism member by passing through said second surface, wherein both said second surface and said third surface are curved surface configurations, and at least one of the curved surface configurations is formed from a rotationally asymmetric curved surface.

2. An image-forming optical system according to claim 1, wherein said second surface of said prism member is formed from a totally reflecting surface so as to have both a transmitting action and a reflecting action.

3. An image forming optical system according to claim 1, which satisfies the following condition:

$$30°<\alpha<70°$$

where $\alpha$ is an angle formed between said second surface of said prism member and an optical axis of the light rays from said object side.

4. An image-forming optical system according to any one of claims 1 to 3, wherein said rotationally asymmetric curved surface is formed from a configuration having an aberration correcting action to correct decentration aberrations caused by reflection in said prism member.

5. An image-forming optical system according to claim 4, wherein said third surface is formed from said rotationally asymmetric curved surface.

6. An image-forming optical system according to claim 5, wherein said first surface is formed from a spherical surface configuration.

7. An image-forming optical system according to claim 4, wherein said second surface is formed from a spherical surface configuration.

8. An image-forming optical system according to claim 7, wherein said first surface is formed from a spherical surface configuration.

9. An image-forming optical system according to claim 4, wherein both said second surface and said third surface are formed from rotationally asymmetric curved surfaces.

10. An image-forming optical system according to claim 9, wherein said first surface is formed from a spherical surface configuration.

11. An image-forming optical system according to claim 4, wherein said first surface, said second surface and said third surface are all formed from rotationally asymmetric curved surfaces.

12. An image-forming optical system according to claim 4, wherein said third surface is formed from a curved surface configuration having a concave surface directed toward said medium.

13. An image-forming optical system according to claim 4, wherein said second surface is formed from a curved surface configuration having a concave surface directed toward the image.

14. An image-forming optical system according to claim 4, further comprising a lens disposed closer to the object than said prism member.

15. An image-forming optical system according to claim 14, wherein said lens is a positive lens.

16. An image-forming optical system according to claim 14, wherein said lens is a negative lens.

17. An image-forming optical system according to claim 4, further comprising a lens disposed closer to the image than said prism member.

18. An image-forming optical system according to claim 4, further comprising an aperture stop, wherein said prism member is disposed between said aperture stop and said object image.

19. An image-forming optical system according to claim 4, wherein a field angle in a horizontal direction of said prism member is different from a field angle in a vertical direction thereof.

20. An image forming optical system according to claim 19, wherein the field angle in the horizontal direction of said prism member is larger than the field angle in the vertical direction thereof.

21. A camera apparatus according to claim 4, wherein said image-forming optical system is disposed to perform image formation.

22. A camera apparatus according to claim 21, wherein a photographic optical system and a finder optical system are disposed separately from each other.

23. A camera apparatus according to claim 22, wherein said image-forming optical system is disposed in said finder optical system.

24. A camera apparatus according to claim 23, wherein said finder optical system includes, in order from an object side thereof, said image-forming optical system, an image erecting optical system for erecting the object image formed by said image-forming optical system, and an ocular optical system for observing said object image.

25. An ocular optical system arranged to lead an image formed on an image plane to an observer's eyeball, said ocular optical system comprising at least one prism member, wherein said prism member has a first surface, a second surface, and a third surface, said first surface, second surface and third surface facing each other across a medium having a refractive index (n) larger than 1 (n>1), so that light rays from said image enter said prism member by passing through said second surface and are reflected by said third surface and further reflected by said second surface, and the reflected light rays exit from said prism member by passing through said first surface, wherein both said second surface and said third surface are curved surface configurations, and at least one of the curved surface configurations is formed from a rotationally asymmetric curved surface.

26. An ocular optical system according to claim 25, wherein said second surface of said prism member is formed from a totally reflecting surface so as to have both a transmitting action and a reflecting action.

27. An ocular optical system according to claim 25, which satisfies the following condition:

$$30°<\alpha<70°$$

where $\alpha$ is an angle formed between said second surface of said prism member and an observer's visual axis.

28. An ocular optical system according to any one of claims 25 to 27, wherein said rotationally asymmetric curved surface is formed from a configuration having an aberration correcting action to correct decentration aberrations caused by reflection in said prism member.

29. An ocular optical system according to claim 28, wherein said third surface is formed from said rotationally asymmetric curved surface.

30. An ocular optical system according to claim 29, wherein said first surface is formed from a spherical surface configuration.

31. An ocular optical system according to claim 28, wherein said second surface is formed from said rotationally asymmetric curved surface.

32. An ocular optical system according to claim 31, wherein said first surface is formed from a spherical surface configuration.

33. An ocular optical system according to claim 28, wherein both said second surface and said third surface are formed from rotationally asymmetric curved surfaces.

34. An ocular optical system according to claim 33, wherein said first surface is formed from a spherical surface configuration.

35. An ocular optical system according to claim 28, wherein said first surface, said second surface and said third surface are all formed from rotationally asymmetric curved surfaces.

36. An ocular optical system according to claim 28, wherein said third surface is formed from a curved surface configuration having a concave surface directed toward said medium.

37. An ocular optical system according to claim 28, wherein said second surface is formed from a curved surface configuration having a concave surface directed toward the image.

38. An ocular optical system according to claim 28, further comprising a lens disposed closer to the observer's eyeball than said prism member.

39. An ocular optical system according to claim 38, wherein said lens is a positive lens.

40. An ocular optical system according to claim 38, wherein said lens is a negative lens.

41. An ocular optical system according to claim 28, further comprising a lens disposed closer to the image than said prism member.

42. An ocular optical system according to claim 28, wherein a field angle in a horizontal direction of said ocular optical system is different from a field angle in a vertical direction thereof.

43. An ocular optical system according to claim 42, wherein the field angle in the horizontal direction of said ocular optical system is larger than the field angle in the vertical direction thereof.

44. In a finder optical system comprising an objective optical system for forming an object image; an image erecting optical system for erecting said object image; and an ocular optical system for observing said object image;

the improvement which comprises at least one prism member, wherein said prism member has a first surface disposed on a pupil side of said prism member and having a transmitting action; a second surface disposed on an image side of said prism member and having both a transmitting action and a reflecting action; and a third surface having a reflecting action, wherein both said second surface and said third surface are curved surface configurations, and at least one of the curved surface configurations is formed from a rotationally asymmetric curved surface.

45. An ocular optical system according to claim 44, wherein said first surface of said prism member is formed from a curved surface.

46. A camera apparatus according to claim 44 or 45, which has said finder optical system.

47. A camera apparatus according to claim 46, which has a photographic optical system provided separately from said finder optical system.

* * * * *